R. W. JENKS, Jr., & F. A. STEERE.
Car Starter.
No. 27,910.
Patented Apr. 17, 1860.
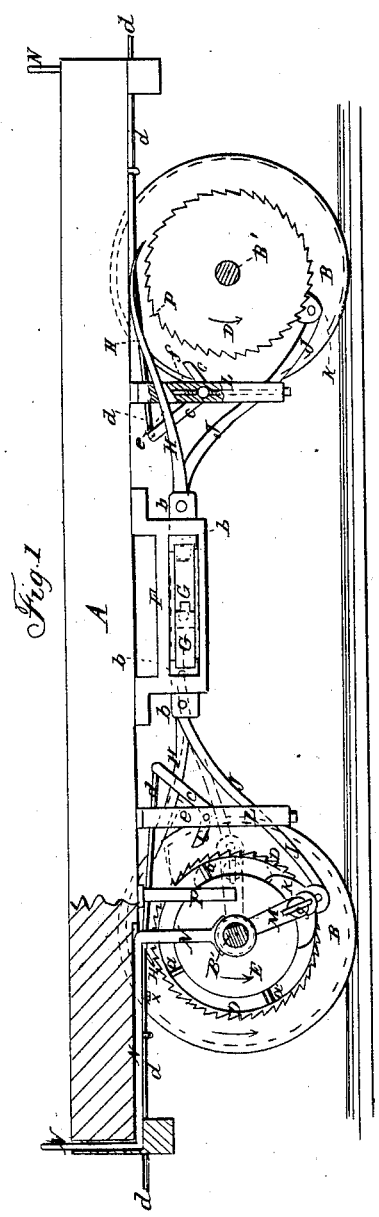
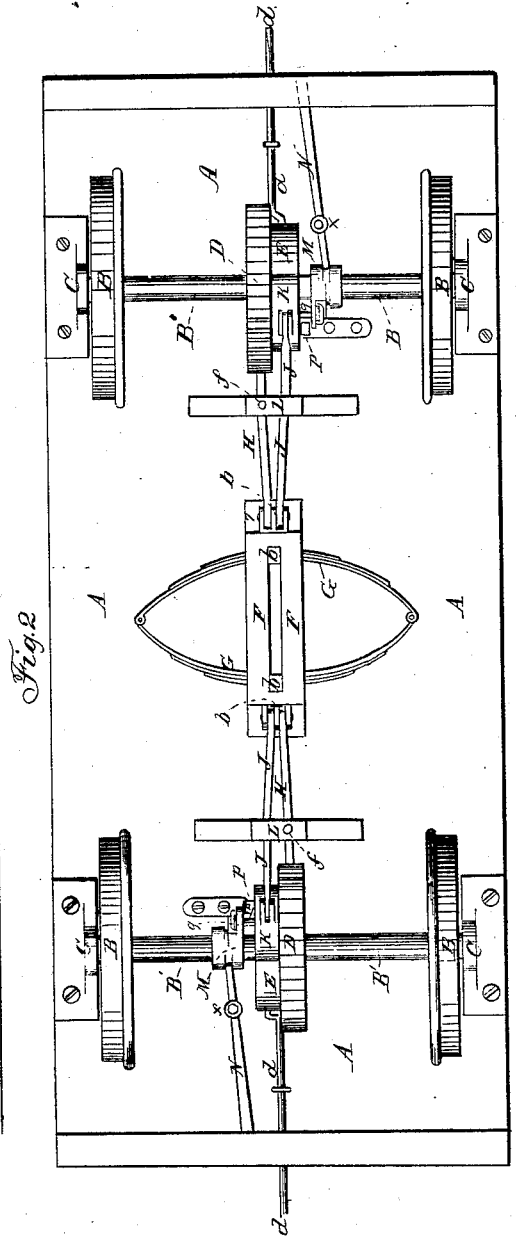

UNITED STATES PATENT OFFICE.

R. W. JENKS, JR., AND F. A. STEERE, OF PROVIDENCE, RHODE ISLAND.

BRAKE FOR CITY-RAILROAD CARS.

Specification of Letters Patent No. 27,910, dated April 17, 1860.

*To all whom it may concern:*

Be it known that we, R. W. JENKS, Jr., and F. A. STEERE, both of Providence, in the county of Providence, and State of Rhode Island, have invented a new and Improved Brake for Horse-Cars; and we do hereby declare that the following is a full, clear, and exact description thereof, reference being had to the accompanying drawings, forming a part of this specification, in which—

Figure 1, represents a side elevation of the floor of a car, and the arrangement of brakes under the same. The two car wheels are removed to show the parts clearly. Fig. 2, is a bottom view of the brakes and running gear.

Similar letters of reference indicate corresponding parts in both figures.

The object of this invention and improvement in horse cars, and particularly those used on street railroads, is to transfer the operation of the brakes to the axles in stopping the car, in such a manner that the momentum of the car will influence its braking up, thus obviating the laborious work of the driver with the present arrangement where a hand wheel is used, and in which case the driver is obliged to check his horses with one hand while he winds up the brakes with the other, then in starting the car from a dead stand great exertion is required on the part of the horses, particularly if the car is heavily loaded. To obviate this objection, our system of brakes are so constructed and arranged that in starting the car they will operate with great effectiveness and give an impulse to the car sufficient to overcome the extra power at present required of the horses. For street railroad cars these advantages will be more readily felt as the cars are continually stopping and starting on the route, to receive and discharge passengers, and where passing vehicles are on the track.

To these ends our invention consists in the arrangement of an elliptic spring, or a spring of any suitable description in such a relation to the brakes that are made to operate upon a cylindrical drum wheel fixed to the axles, that by the combination of a clutch attachment and ratchet wheel, the driver may apply the brakes at any moment to said drum, which will cause either axle of the car wheels to act against the spring and compress it, after which the spring will exert a powerful force to further retard the motion of the car by the friction, of the brakes on the drum wheel, alone. The same force, viz., that of the spring, will give a forward impulse to the car when the brakes are relieved, as will be hereinafter described and represented. The applying of the brakes will be made by the driver by a simple movement of his hand, and their release will be effected by the draft of the horses in starting off. Very little power will be requisite in either instance as will be shown.

To enable those skilled in the art to fully understand our invention we will proceed to describe its construction and operation.

A, represents the flooring of the car, B, the car wheels, C, the pedestals in which are hung the axles B'. These parts are all in common with those of the present construction for city cars.

In the middle of each axle B', or thereabout, is keyed a ratchet wheel D, and on one side of each wheel D is a drum wheel E, having a wide, smooth periphery. These wheels E, E, are somewhat smaller in diameter than the ratchet wheels D, D, and they project slightly under the surface of the ratchet wheels which are turned out to admit them, or the ratchets and smooth wheels may be cast solid, and an annular recess turned out, having in each four ribs, *a, a, a, a,* (Fig. 1) for the purpose to be hereinafter described.

In the middle of the floor A, and in a vertical plane with the wheels E, E, and D, D, is secured a slide box F, in which is placed an elliptic spring G, which is kept in place by two movable blocks *b, b,* that have a longitudinal sliding motion in the box F. To the outer ends of each block *b,* is attached by pivots a pawl bar H, that acts upon the ratchet wheel D, and a brake bar J, that acts upon the smooth wheel E. The arrangement and operation of the parts on each side of the spring G, are precisely alike, and it will not therefore be necessary to describe each appliance separately, suffice it to say, however, that the spring G, is made to act upon either one of the brakes, thus making one spring serve for both, as will be further described.

The pawl bar H, passes over the ratchet wheel D, while the brake or shoe bar J, passes under the smooth brake wheel E, and its end is pivoted to the shoe K that is curved out on its surface so as to fit closely to the wheel E. Both of the bars H, J, pass through a bracket L, that keeps them in place, in which bracket is pivoted a right angular lever c, to one arm of which is pivoted the draft bar d, that passes out from the end of the car, as represented in the drawings, and to which is suitably attached the draft pole for the horses. The lever c, serves to throw off the brake by starting the shoe bar J, as will be hereinafter described.

The pawl bar H, has a wedge projection e, on its under side which strikes an adjustable pin f, arranged within the bracket L, when the lever c, is made to relieve the brake, and throws this pawl bar from the ratchet and allows the car wheels to turn freely so long as the shoe K, is not acting on its wheel but instantly the shoe is confined to the wheels, as will be hereinafter shown, they begin to act upon spring G, the pawl bar engages again with the teeth of its ratchet wheel. The object of this pawl bar H, is to hold the shoe in a confined state when the brake is applied until the shoe is relieved by drawing on the lever rod d.

On one side of the wheel E, and placed loosely on the axle B', is a clutch arm M, carrying on its end a pin g, that passes through the shoe K, shown in Fig. 2. This arm, with its pin, has a lateral movement given to it by a lever N, which is pivoted at X, to the under side of the floor, the lever turns up at one end, and is placed in a convenient situation to be operated by the driver on the platform, and at the other end it turns down and fits into an annular groove in the loose collar of clutch arm M, so that the arm may be moved to or from the wheels, D, E, on the axle B', by vibrating the lever N.

P, is a fixed wedge bar, projecting down by the side of the brake wheel E, which throws the arm N, out, and disengages the pin g, from the wheel D, or in other words, places the parts in such a position that when the car is started again, the lever c, will throw the shoe K, off from the wheel E.

From this description it will be seen that the driver can effect the braking up of the car by moving the lever N, to one side either with his foot or hand, and that the brake is self-disengaging.

The operation of the parts may be briefly described as follows: When the driver wishes to have the brakes applied, he presses the lever N to one side. This movement throws the pin g, into contact with the pins a, between the wheel F, and under surface of ratchet wheel D. The axle B', will then be clutched to the brake rod J, and the spring G, will be rapidly compressed until the arm N, reaches the point shown in red lines in Fig. 1 (on one end of the car) when it will be thrown out and disengage the pin g, from the wheels D, E, the spring G, will thus act directly upon the brake rod and its shoe, and stop the motion of the car. Now to start again, the horses pull on the rod d, and this operates a lever c, which throws the shoe, K, off the brake wheel, and spring G, then reacting with great force through the medium of pawl bar A, and ratchet wheel D, gives a sudden impetus to the car wheels which start the car from a state of rest, then the horses can keep up its motion. The wedge projection e, on the pawl bar striking a rod f, throws the pawl from the ratchet wheel so that the wheels and axle may turn without hindrance. The same operation precisely takes place in both ends of the car, the spring G, serving for both operations, and for applying the brake to each axle separately.

Having thus described our invention what we claim and desire to secure by Letters Patent, is—

1. The combination with spring G, working in a suitable slide box of the pawl bar H, brake bar J, with its shoe K, the ratchet wheel D, and brake wheel E, and the sliding clutch arm M, with its pin g, passing through the shoe K, the whole arranged, operating and operated by a lever, N, substantially as and for the purposes herein set forth.

2. We further claim the lever c arranged as set forth and operated by the draft rod d, in conjunction with the brake bar J, for the purposes specified.

R. W. JENKS, Jr.
F. A. STEERE.

Witnesses:
  JOHN R. RANDOLPH,
  EARL C. HARRIS.